United States Patent
Jensen et al.

(10) Patent No.: US 7,140,181 B1
(45) Date of Patent: Nov. 28, 2006

(54) REACTOR FOR SOLAR PROCESSING OF SLIGHTLY-ABSORBING OR TRANSPARENT GASES

(76) Inventors: Reed Jensen, 112-C Longview Dr., Los Alamos, NM (US) 87544; Ann J. Traynor, 1654 Townwood Ct., Charlottesville, VA (US) 22901

( * ) Notice: Subject to any disclaimer, the term of this patent is extended or adjusted under 35 U.S.C. 154(b) by 604 days.

(21) Appl. No.: 10/379,325

(22) Filed: Mar. 3, 2003

Related U.S. Application Data

(60) Provisional application No. 60/360,589, filed on Mar. 1, 2002.

(51) Int. Cl.
*B60K 16/00* (2006.01)
*C10J 3/20* (2006.01)
*B01J 19/08* (2006.01)

(52) U.S. Cl. ............ 60/641.8; 48/85; 422/186
(58) Field of Classification Search .......... 60/641.8, 60/641.15; 48/85, 197; 422/186, 186.3
See application file for complete search history.

(56) References Cited

U.S. PATENT DOCUMENTS

| | | | | |
|---|---|---|---|---|
| 4,121,564 | A | * | 10/1978 | Schwartz .............. 126/684 |
| 4,290,779 | A | * | 9/1981 | Frosch et al. .......... 422/186 |
| 4,405,594 | A | * | 9/1983 | Pyle .................. 423/579 |
| 6,066,187 | A | * | 5/2000 | Jensen et al. .......... 48/85 |

OTHER PUBLICATIONS

"Direct Solar Reduction of CO2 to Fuel: First Prototype Results", Ann J. Traynor and Reed J. Jenson, Ind. Eng. Chem. Res. 2002, 41, pp. 1935-1939.
"The Ultraviolet Absorption Spectrum of Hot Carbon Dioxide," Reed J. Jensen, Robert D. Guettler and John L. Lyman, Chemical Physics Letters 277 (1997) pp. 356-360.
"High Resolution Absorption Spectrum of CO2 between 1750 and 2000 A 1. Rotational Analysis of Nine Perpendicular-Type Bands Assigned to a New Bent-Linear Electronic Transition," Claudina Cossart-Magos, Francoise Launay and James e. Parkin, Molecular Physics, 1992, vol. 75, No. 4, pp. 835-856.
"Bent Valence Excited States of CO2," A. Spielfiedel, N. Feautrier, C. Cossart-Magos, G. Chambaud, P. Rosmus, H.-J. Werner and P. Botschwina, J. Chem. Phys., vol. 97, No. 11, Dec. 1, 1992, pp. 8382-8388.
"On the Assignment of the Electronically Excited Singlet States in Linear CO2," Peter J. Knowles, Pavel Rosmus and Hans-Joachim Werner, Chemical Physics Letters (1988) , vol. 146, No. 3,4, pp. 230-235.

(Continued)

*Primary Examiner*—Hoang Nguyen
(74) *Attorney, Agent, or Firm*—Rod D. Baker

(57) ABSTRACT

Solar-powered reactor for processing of slightly absorbing and transparent gases. An obvious path to providing storable, renewable energy is through solar dissociation of gas molecules. These dissociation products are the precursors of modern liquid and gaseous fuels such as hydrogen and methanol/ethanol. An apparatus and method using a solar concentrator (such as a focusing trough or dish) directed at the receiving end of a reactor are disclosed. A range of designs of reactors for the dissociation of gases, both those that absorb slightly in the visible spectrum and those that are transparent in the visible and only absorb in the infrared, is described. For slightly-absorbing gases, a funnel-shaped reactor that preheats the gas and concentrates sunlight is the indicated embodiment. A system for dissociating $CO_2$ using the invention is described. For transparent gases, a holraum embodiment is more appropriate for coupling solar energy into the gas. In both cases, heat from the hot stream of dissociated gas may also be used to produce electricity with a standard steam or Stirling cycle generator.

21 Claims, 8 Drawing Sheets

OTHER PUBLICATIONS

"Solar Conversion of CO2 to Fuel," Reed J Jensen and John L. Lyman, LA-UR-98-3699.

"Photodissociation of (2 and CO2 From Vibrationally Excited States at High Tempteratures," Mitsuo Koshi, Masabumi Yoshimura and Hiroyuki Matsui, Chemical Physics Letters (1991), vol. 176, No. 6, pp. 519-525.

"Electronic Spectroscopy of Isoelectronic Molecules. II. Linear Triatomic Groupings Containing Sixteen Valence Electrons," J.W. Rabalais, J.M. McDonald, V. Scherr and S.P. McGlynn, Chemical Reviews, 1971, vol. 71, No. 1, pp. 73-108.

"Chemical Kinetic Data Base for Combustion Chemistry. Part 1. Methane and Related Compounts," W. Tsang and R.F. Hampson, J. Phys. Chem. Ref. Data, vol. 15, No. 3, 1986.

"Janaf Thermochemical Tables," Dow Chemical Company, Aug. 1965.

* cited by examiner

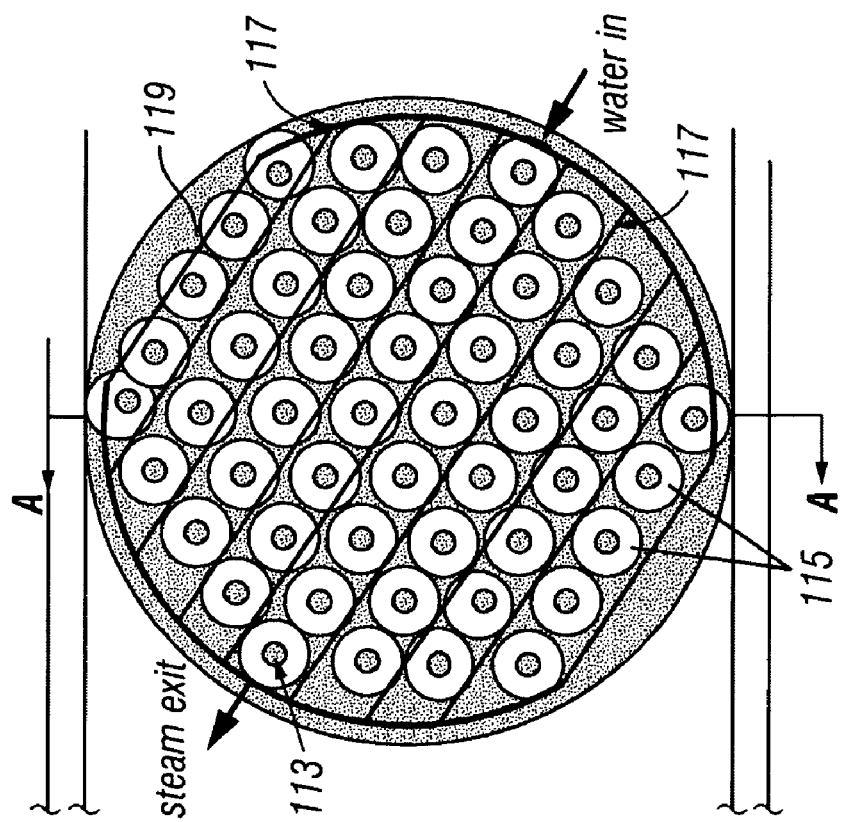
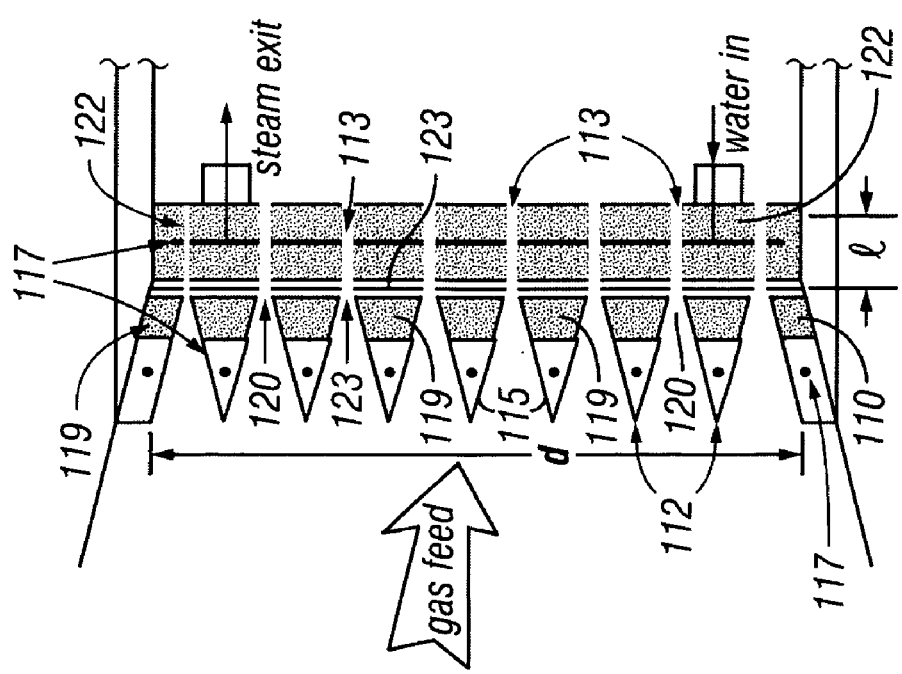

REACTOR FOR SOLAR PROCESSING OF SLIGHTLY-ABSORBING OR TRANSPARENT GASES

CROSS-REFERENCE TO RELATED APPLICATIONS

This application claims the benefit of the filing of U.S. Provisional Patent Application Ser. No. 60/360,589, entitled Solar Processing of Grey or Transparent Gases, filed on Mar. 1, 2002, and the specification thereof is incorporated herein by reference.

BACKGROUND OF THE INVENTION

1. Field of the Invention (Technical Field):

The present invention relates to the use of solar energy for the processing of gases, particularly for the thermal dissociation of gases, and specifically for a method and apparatus for processing slightly-absorbing or transparent gases, including $CO_2$, $CH_4$, $H_2O$ and combinations thereof, and others.

2. Background Art

The industrialized world presently relies heavily on fossil fuels for its energy. The very large-scale combustion of these fuels causes a number of environmental concerns, including accumulation of carbon dioxide ($CO_2$) in the Earth's atmosphere. Much of the demand is for convenient-to-use liquid and gaseous fuels. The present invention is of solar reactor designs to enable the deposition of solar energy in gases, leading to their endothermic dissociation into smaller molecules that are the starting point of synthesis of convenient liquid and gaseous fuels. An example of such a process is the direct solar reduction of $CO_2$ to carbon monoxide (CO) and molecular oxygen ($O_2$), as disclosed in U.S. Pat. No. 6,066,187 and in Traynor, A., et al., "*Direct Solar Reduction of CO2 to Fuel. First Prototype Results,*" Ind. Eng. Chem. Res. 2002, 41, 1935–1939. In general, the process includes molecular dissociation, which can be accomplished by heating or by the absorption of a sufficiently energetic photon, followed by the extinguishing of the back reaction. At the critical point in the process, high energy products exist in reactive mixtures at high temperatures. It is necessary to arrest such reactions by suddenly dropping the temperature, diluting the mix, or both. This rapid extinguishing of the back reaction is referred to as "quenching."

Some gases absorb or have inducible absorption in the solar region of the spectrum. The gases of interest to the present invention are slightly absorbing at most, and will be referred to as such. Carbon dioxide is an example of this class of gases. Normally, it has no absorption bands in the solar ultraviolet or visible spectral regions. But if it is radically heated it does begin to absorb in these regions, as explained further in Jensen, R., et al., "*The Ultraviolet Absorption Spectrum of Hot Carbon Dioxide,*" Chem Phys Lett. 1997, 277, 356, and in U.S. Pat. No. 6,066,187. Other molecules of interest share this property. Almost all of these slightly absorbing molecules develop increased absorption in the visible spectrum if preheated. For these gases, strong preheating is necessary before absorption of sunlight is possible. The present invention provides an apparatus and method that preheats and then exposes the subject gas to a maximum intensity of direct solar photons to perform heating and photolysis.

Molecules that are non-absorbing in the visible spectrum and show little or no enhancement of absorption upon preheating are termed "transparent." Such gases require a specialized type of reactor. In their case, energy must be added to the molecule either by contact with a hot surface or by absorption in the infrared region of the spectrum. All of the molecules of interest have strong absorption in the infrared. For each case it is possible to heat them through infrared photon absorption. This preferably is accomplished by an apparatus we refer to as a "holraum reactor." The holraum reactor uses a process of absorbing visible light into a solid, which can then re-radiate the energy in a spectrum that is shifted toward the infrared.

U.S. Pat. No. 6,066,187 is useful as a description of the prior art. The '187 patent contemplates a very large funnel accepting highly focused light from thousands of square meters of mirrors with a huge focal spot. For reasons both technical and economic, there is a need for an apparatus of a much smaller size, for example 100 square meters of reflective surface with a five or six inch spot.

SUMMARY OF THE INVENTION (DISCLOSURE OF THE INVENTION)

A solar-powered reactor is disclosed for processing of slightly absorbing and transparent gases. An obvious path to providing storable, renewable energy is through solar dissociation of gas molecules. These dissociation products are the precursors of modern liquid and gaseous fuels such as hydrogen and methanol/ethanol. An apparatus and method using a solar concentrator (such as a focusing trough or dish) directed at the receiving end of a reactor are disclosed. A range of designs of reactors for the dissociation of gases, both those that absorb slightly in the visible spectrum and those that are transparent in the visible and only absorb in the infrared, is described. For slightly-absorbing gases, a funnel-shaped reactor that preheats the gas and concentrates sunlight is the indicated embodiment. A system for dissociating $CO_2$ using the invention is described. For transparent gases, a holraum embodiment is more appropriate for coupling solar energy into the gas. In both cases, heat from the hot stream of dissociated gas may also be used to produce electricity with a standard steam or Stirling cycle generator.

A primary object of the present invention is to provide an apparatus for effectuating the heart of the process of solar disassociation of molecules into fuel precursors.

A primary advantage of the present invention is that it provides secondary focusing of solar energy to realize the high intensity and high temperatures needed for disassociation processes, along with the necessary rapid cooling or quenching to prevent re-associating back-reactions.

There is provided according to the invention a solar powered endothermic reactor apparatus for processing slightly-absorbing or transparent gases, the apparatus comprising: a reaction zone through which passes the process gas; means for concentrating incoming solar radiation in the reaction zone; and means for limiting back-radiation losses from the reaction 10 zone by controlling direct reflection and thermal re-radiation. The means for concentrating comprises a highly reflective funnel, the funnel comprising: a longitudinal axis; a mouth for the admission of solar energy; a wall having an optically smooth inner surface and defining a radial cross-sectional area of the funnel, wherein the cross-sectional area monotonically decreases along the axis from the mouth toward the reaction zone. The funnel wall defines a cone of revolution around the axis, or, alternatively, a paraboloid of revolution around the axis. The optically smooth inner surface preferably comprises highly reflective metal. The means for limiting back-radiation losses comprises means for limiting a high-temperature area of the reaction zone. The means for limiting preferably comprises a hot ceramic rod in a zone of highest irradiance along the axis. The apparatus preferably further comprising means for actively cooling the funnel wall. The means for limiting back-radiation losses preferably comprises a holraum reactor chamber disposed downstream from the reaction zone, the holraum reactor chamber comprising: an intake aperture for admitting process gas; and black walls; wherein the ratio of the area of the intake aperture to the area of the walls is less than approximately 0.5, and the holraum reactor chamber exhibits limited radiation loss due to the ratio. The means for concentrating comprises a highly reflective funnel collector, and the means for eliminating back-radiation losses comprises a holraum reactor chamber, the holraum reactor chamber comprising an intake aperture for admitting process gas; and black walls; wherein the ratio of the area of the intake aperture to the area of the walls is less than approximately 0.5, and wherein the funnel collector facilitates gathering sunlight through the intake aperture in to achieve the area ratio. The apparatus preferably further comprises a large-area cool surface downstream the reaction zone, wherein the ratio of cooling surface to gas flow area is at least 5.0. The apparatus alternatively further comprises a multi-funnel plate and a matching cooling plate. The multi-funnel plate defines a highly reflecting metal portion and a rearward ceramic throat portion. Such an embodiment of the apparatus may further comprise a radiation shield disposed between the hot multi-funnel plate and the matching cooling plate, and may also include means for injecting cool fluid into the process gas immediately downstream from the reaction zone.

There also is provided a method for solar powered processing of a slightly-absorbing or transparent gas, comprising the steps of passing the gas through a reaction zone; concentrating incoming solar radiation in the reaction zone; and injecting cool fluid into the process gas immediately downstream from the reaction zone to arrest a back-reaction. The step of arresting a back-reaction may comprise arresting the reactions: $CO+O+M \rightarrow CO_2+M$ and $CO+O_2 \rightarrow CO_2+O$. The method may comprise the additional step gathering heat from a reactor structure to suppress re-radiation and to drive a heat engine. The step of gathering comprises gathering heat from a cooling mechanism that arrests the back reaction by cooling the gas to a cool temperature. The back reactions to be arrested by the method include: $CO+O+M \rightarrow CO_2+M$ and $CO+O_2 \rightarrow CO_2+O$; and the cool temperature to be achieved is less than approximately 800 C.

There also is disclosed a method for solar powered processing of a gas that absorbs only infrared light, the method comprising: directing solar energy, in the form of light rays, into a holraum reactor chamber; admitting the gas into a holraum reactor chamber; allowing the light rays to repeatedly strike interior walls of the holraum reactor chamber; and re-thermalizing the solar energy, thereby restoring the portion of the solar spectral energy that is absorbed by the gas.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3A is a side (longitudinal) sectional view of a multi-funnel embodiment of a reactor apparatus according to the present invention, taken along line A—A in FIG. 3B;

FIG. 3B is an end (radial) sectional view of the embodiment of the apparatus shown in FIG. 3A;

Figure 1:
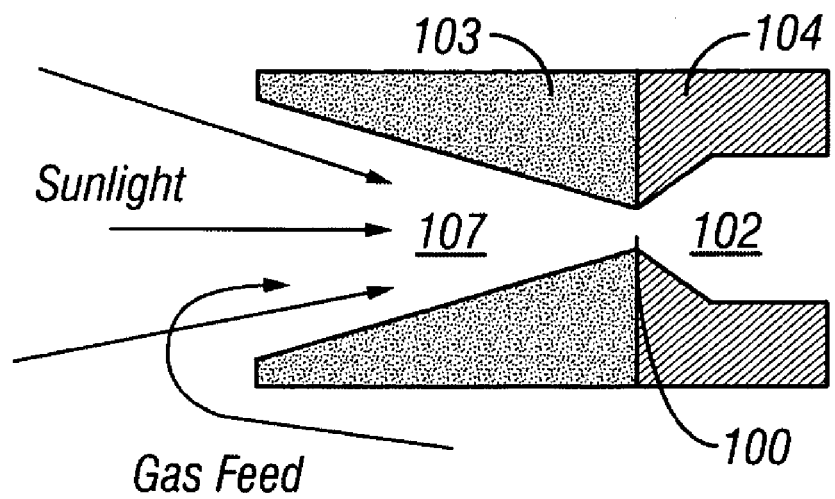
FIG. 1 is a schematic side (longitudinal) sectional view of a reactor apparatus according to the invention for processing slightly-absorbing gas.

DESCRIPTION OF THE PREFERRED EMBODIMENTS (BEST MODES FOR CARRYING OUT THE INVENTION)

The invention relates to an apparatus and method for harnessing solar energy to accomplish processing of slightly-absorbing and transparent gases. We have invented solar-driven gas reactor apparatuses and methods for efficiently depositing and storing energy in gaseous fuels or their precursors. The design range of the inventive apparatus includes mechanisms for concentrating the light beyond the level at which it reaches the mouth of the apparatus, means for heating the gas before and while it is being irradiated, means for limiting radiative loss from the reaction zone (both of reflected solar radiation and thermal radiation from the hot reactor), and means for quenching undesired back reactions by suddenly dropping the temperature to the point where undesirable back reactions are insignificant. The inventive apparatus includes a slightly-absorbing gas reactor embodiment, and a transparent gas reactor embodiment.

Slightly-Absorbing Gas Reactor

Many gases of interest to the practice of the invention, such as $CO_2$, methane ($CH_4$), water ($H_2O$), hydrogen sulfide ($H_2S$), and sulfur dioxide ($SO_2$), absorb very little light in the solar region of the electromagnetic spectrum. However, if they are highly preheated, they become stronger absorbers and thus can absorb more sunlight. This results at least in part from the fact that heat imparts vibrational energy to the molecule, which in turn enables the molecule to transition to some of the upper electronic states that would otherwise be forbidden. This, in effect, initiates absorption of solar photons, which leads to more heating and better absorption.

For example, the dissociation of $CO_2$ to CO at high temperature is well known from thermodynamics, but it can also be dissociated by direct photolysis using this preheating method. The process is represented by the equation:

$$CO_2 + h\nu \text{ or heat} \rightarrow CO + \tfrac{1}{2}O_2 \qquad \text{(Equation 1)}$$

Direct solar absorption in $CO_2$ is enabled by intense preheating, which results in a radical spreading of the absorption spectrum of $CO_2$ to longer wavelengths, thus allowing it to absorb solar light rather than vacuum ultraviolet only. The heating imparts vibrational bending in the $CO_2$ molecule to enable strong optical connections by symmetry, and by Frank Condon factors, to a set of bent intermediate states, as explained in the following publications: Cossart-Magos, C., et al., "*High resolution absorption spectrum of $CO_2$ between 1750 and 2000 Å. 1. Rotational analysis of nine perpendicular-type bands assigned to a new bent-linear electronic transition,*" Mol. Phys. 1992, 75, 835; Spielfiedel, A.; et al., "*Bent valence excited states of $CO_2$,*" J. Chem. Phys. 1992, 97, 8382; Knowles, P. J., et al., "*On the Assignment of the Electronically Excited Singlet States in Linear $CO_2$,*" Chem. Phys. Lett. 1988, 146, 230; and Jensen, R., et al., "*Solar Conversion of $CO_2$ to Fuel,*" Proc. 4th International Conf on Greenhouse Gas Control Technol. 30 Aug.–2 Sep. 1998, Interlaken, Switzerland. These states then serve as stepping-stones to rapid bulk heating and photolysis. The dramatic increase, with increasing temperature, in the negative Gibbs free energy of formation of CO pulls the reaction in the direction of the CO product as the feed stream is heated both directly and through recombination. This induced absorption results in further heating, photolysis and pyrolysis of $CO_2$ to CO by concentrated solar light. The chemistry can then be quenched and frozen against back reaction by rapid cooling.

For $CO_2$, the preheating condition is satisfied for an adequate fraction of the molecules when the temperature is approximately 2200 C, as set forth in Jensen, R., et al, "*The Ultraviolet Absorption Spectrum of Hot Carbon Dioxide,*" Chem Phys Lett. 1997, 277, 356, and in Koshi, M., et al., "*Photodissiciation of $O_2$ and $CO_2$ from vibrationally excited states at high temperatures,*" Chem. Phys. Lett. 1991, 176, 519. The calculated absorption cross-sections for hot $CO_2$ and the implied heating in an irradiance of 5000 suns are given by Traynor, A., et al., "*Direct Solar Reduction of CO2 to Fuel. First Prototype Results*" and Jensen, et al., "*The Ultraviolet Absorption Spectrum of Lot Carbon Dioxide.*"

Figure 2:
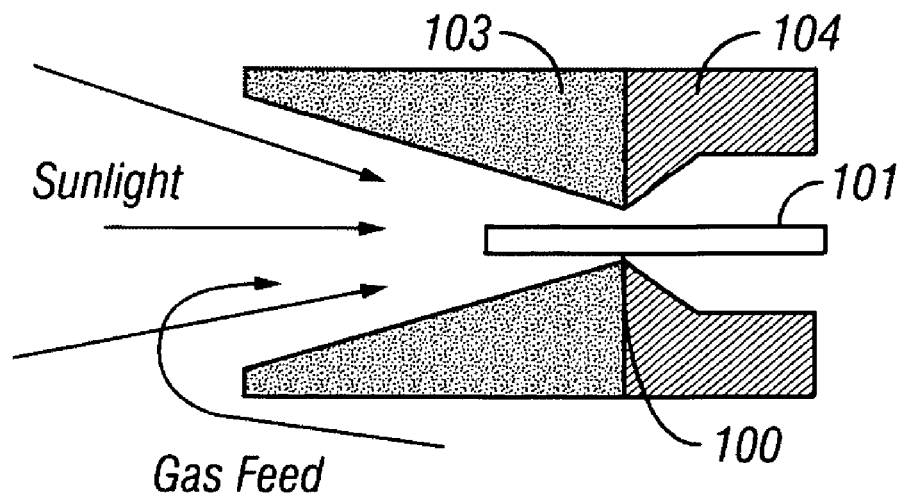
FIG. 2 is a schematic side (longitudinal) sectional view of a reactor apparatus according to the invention, similar to the embodiment seen in FIG. 1, but also including a central hot rod disposed on the reactor's longitudinal axis.

Attention is invited to FIGS. 1–3, illustrating the inventive apparatus for use with slightly-absorbing gases of interest. The solar reactor for slightly-absorbing gas features a funnel-shaped reaction chamber 107, with the throat opening 100 to a quenching chamber 102 defined by walls 104. Sunlight is directed into the reaction chamber as indicated by the light directional arrows in FIG. 1. As suggested by the heavy directional arrow in FIG. 1, the subject gas flows into the mouth of the funnel 103; it may do so through any of a number of possible pathways. Many possible pathways (for example, through the body of the funnel 103) could also serve to begin preheating the gas. The gas is contained in the reaction chamber 107 of the funnel 103 by a transparent window (not shown), fashioned for example from quartz, and drawn toward the throat 100 and quenching chamber 102 by a pressure gradient. The funnel 103 is composed of a highly reflective material. The funnel shape of the reactor serves to greatly intensify the sunlight as it comes in the mouth of the funnel 103 and reflects off the reflective walls of the funnel 103 toward the throat 100. This intensification process has been confirmed using ray-tracing methods.

The area of greatest intensity is along the centerline, or longitudinal axis, of the funnel 103. The funnel 103 puts the gas flow in an area of very concentrated sunlight, enabling the gas to absorb light energy as soon as it is sufficiently preheated. Downstream from the throat 100, the reaction is quenched by contact with the walls 104 of the quenching chamber 102, which are comparatively cold, as they have no exposure to the sunlight. In addition, jets (not shown in FIG. 1) of unheated gas can be introduced into the quenching chamber 102 to more quickly mix and cool the gas (as suggested by FIG. 7). The exhaust stream, although cooled from its highest temperatures, is still sufficiently hot to transfer significant heat energy through a conventional heat exchanger to heat steam, or to any other suitable medium for electricity production by heat engine.

There are three variations of the apparatus. For gases that have an adequate absorption cross-section of direct solar photons to enable substantial dissociation without strong preheating, a simple light-concentrating cone is the indicated design, as shown in FIG. 1. The cone preheats the gas through contact, and then facilitates direct solar absorption by intensifying the solar radiation as described above. The intensification increases the flux of solar photons, which consequently increases the opportunity for the molecules to absorb one or more of them.

In a second embodiment, illustrated FIG. 2, a hot central rod funnel reactor, a rod 101 is cantilevered through the reactor, extending along its centerline axis partway upstream and downstream of the throat 100. This alternative embodiment otherwise is substantially similar to the embodiment of FIG. 1 as to form and function. The rod 101 serves to preheat the passing gas. Rod 101 becomes extremely hot due to the intense sunlight energy directed to the centerline axis of the funnel 103. The rod 101 is fashioned from a very high temperature material, such as a ceramic. The rod 101 provides surface area for contact heating, and is also much hotter than the walls of the funnel 103 because of its position on the axis and its absorption properties. Significant molecular dissociation occurs along and in the immediate vicinity of the hot rod 101 because it preheats the gas and also is disposed in the location of greatest solar irradiation for direct photolysis.

A third embodiment, a multi-hot wall funnel reactor, is depicted in FIGS. 3A and 3B. This embodiment includes a body 110 having a diameter d and an array of a plurality of comparatively small fore-funnels 112 to supply increased contact area for heating the gas. Each fore-funnel 112 corresponds and leads to an associated cooling channel 113 for cooling the gas of interest. The forward or "upstream" portion of each of the fore-funnels 112 is composed of highly reflecting metal portion 115, appearing as reflective annuli in FIG. 3B. The fore-funnels 112 are water-cooled in a mostly ordinary manner, by coolant flowing through water channels 117 also as shown in FIGS. 3A and 3B. The downstream, rearward or throat end portion 119 of each of the fore-funnels 112 is fashioned of high-temperature ceramic, such as $ZrO_2$ or the like. The optical energy is intensified near the small-aperture throat 120 of each fore-funnel 112, and creates very hot walls in each fore-funnel for heating and dissociating the passing gas by heat and/or photolysis.

Figure 4:
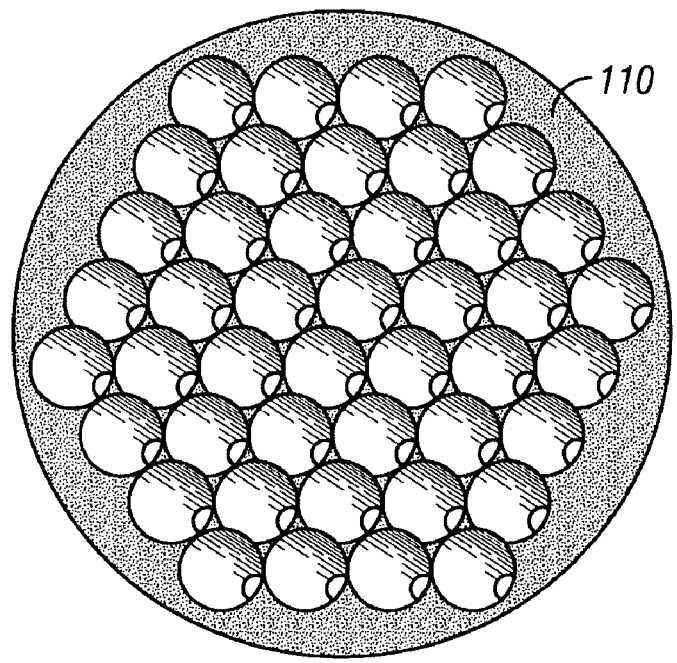
FIG. 4 is a three-dimensional rendering of the front surface of the hot-wall multi-funnel reactor apparatus according to the present invention.

When the gas exits the throat 120 of the hot portion 119 of the reactor, it immediately enters the associated cooling channel 113, where it is cooled to a temperature sufficiently low to quench the reaction. Cooling is achieved rapidly by infrared radiation from the product gas and by contact with the walls of the cooling channels 113. Cooling channels 113 have a length l adequate to quench the back reaction. For the $CO_2$ dissociation process, the quench temperature is approximately 800 C. The very hot ceramic disc that defines the hot portions 119, and the cooler metal quenching plate 122 behind it (FIG. 3A) are thermally isolated from each other by an intermediate metal radiation shield 123. The radiation shield 123 is composed of high temperature metal, such as nickel or the like. The shield 123 defines a plurality of holes therein that are aligned with the funnel throats 120, and is suspended about one-half millimeter (0.5 mm) away from each of the plates 119, 122. The end view shown in FIG. 3B illustrates schematically where the water cooling channels 117 are located in relation to the gas flow channels 113. The water coolant channels 117 in the reflective metal portions 115 of the fore-funnels (FIG. 3A) have a similar pattern. FIG. 4 is a three-dimensional rendition of this multi-funnel body 110.

All of the foregoing embodiments lend themselves to a modular design, where several of the solar reactors process gas independently, then send their products to a single post-processing station that does any necessary separations or chemical reactions.

Transparent Gas Reactor

Transparent gases do not absorb significantly in the visible spectrum, even upon preheating. These gases require an alternative embodiment of reactor that will supply energy in a spectrum shifted toward the infrared. The indicated apparatus for this class of gases is the holraum reactor.

Figure 5:
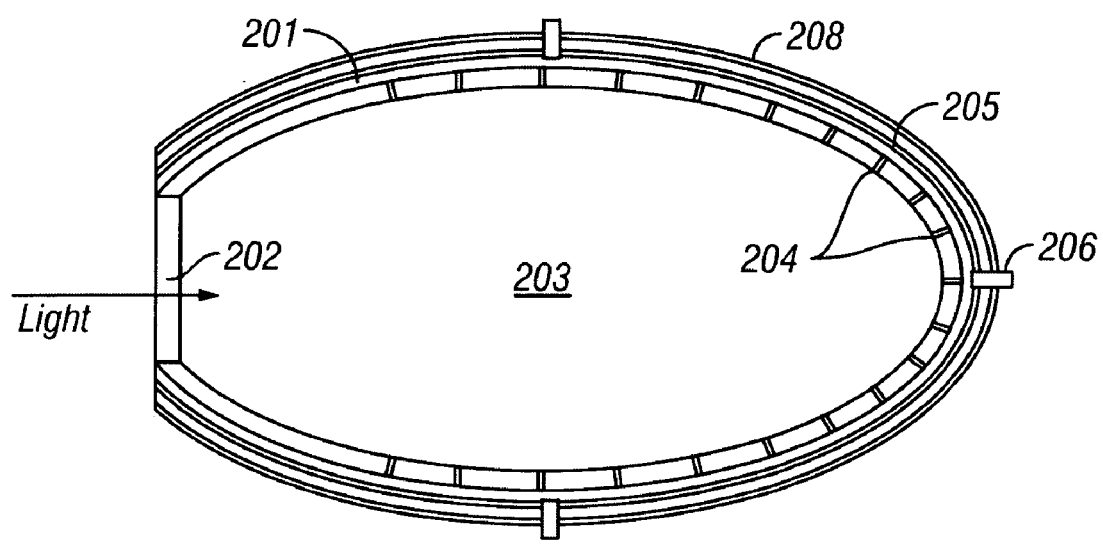
FIG. 5 is a side (longitudinal) sectional view of a holraum reactor alternative embodiment of the apparatus according to the invention.

Reference is made to FIG. 5. Incoming sunlight carries infrared radiation until it reaches the earth's atmosphere, where it is absorbed by atmospheric $CO_2$ and water, while the shorter visible wavelengths pass through. In this holraum reactor of FIG. 5, the sunlight (directional arrow in FIG. 5) is focused from a concentrator into the aperture 202 of a spherical or prolate cavity (holraum) 203. The interior walls 201, i.e., those defining the cavity space 203, are rough and black (non-reflective). A holraum reactor chamber, such as that defined by this apparatus, is one in which thermal radiation from the walls 201 is near equilibrium. The energy loss is controlled by having an enclosing chamber 203 with an aperture 202 for the admission of radiated energy. The size of the aperture 202 determines the energy loss. The size of the aperture 202 in comparison to the whole inside area of the wall 101 of the holraum determines the radiant energy loss. For roughened truly black interior surface of the wall 101 the fractional loss is simply the ratio of the area of the aperture 202 to the area of the wall 101 defining the whole inside of the chamber 203. This ratio preferably is approximately 0.5 or less. As seen in FIG. 5, concentrated sunlight from a reflecting dish or trough (not shown) is directed to enter the holraum chamber 203 through the aperture 202. The sunlight energy is partially absorbed on the walls 201 of the holraum chamber 203, and also partially reflected. Radiation loss from the chamber 203 is reduced by providing that the aperture 202 is small in comparison to the area of the wall 201 defining the chamber 203.

Computer simulations with a ray-tracing program (SUN-CONE.F® software) showed that the foregoing system can reduce the loss to 40% of the incoming radiation, assuming that the chamber walls 201 have an absorbance of 0.85, and that the temperature of the walls is 2500° C.

Process gas is pumped in through the aperture 202 and is heated by contact with the walls 201 and by infrared radiation from the walls 201. It is heated further as it exits through the small exit holes 204 in the walls 201. Upon sufficient heating and absorption of infrared radiation, the gas partially dissociates. After the gas flows out through the exit holes 204, it is quickly cooled, as it impinges on the cooling surface 205, to prevent recombination. It then flows out the exhaust tube 206. The cooling surface 205 can be cooled by water, which flows in the plenum between the cooling surface 205 and the enclosure 208. The water boils to high-pressure steam and can be used to drive a turbine to generate electricity.

Figure 6:
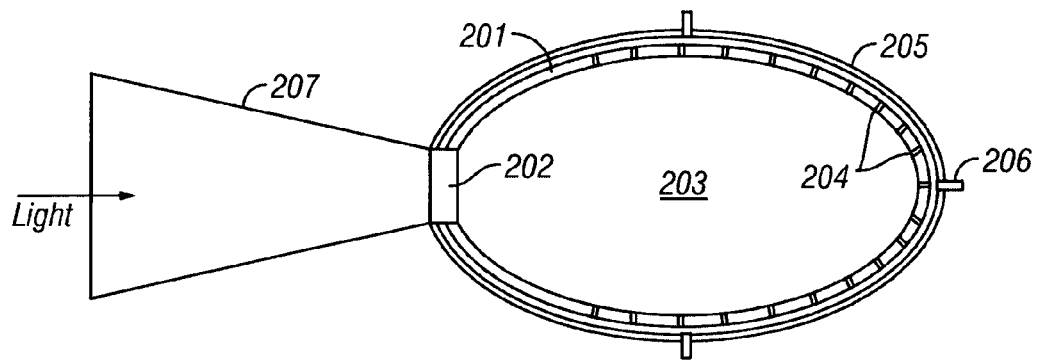
FIG. 6 is a side (longitudinal) sectional view of the embodiment of the apparatus of the invention seen in FIG. 5, also showing the disposition of a front funnel light concentrator.

A variation to this embodiment is presented in FIG. 6. Attaching a reflective cone 207 to the front of the aperture 202 reduces the size of the light beam (see directional arrow in FIG. 6) to a smaller diameter than that of the focal spot size of the externally associated parabolic reflector (not shown). Consequently, the aperture 202 of the holraum chamber 203 can be made smaller, and the energy loss is reduced significantly. Light enters the mouth of the cone 207 from the left (as seen in FIG. 6) and is condensed in cross sectional area to correspond generally to the area defined by the holraum aperture 202. Although the interior of the cone 207 is reflective, it gets hot, and this energy can be used to preheat the gas as it flows through the cone toward the holraum chamber 203.

Computer simulations have shown that a suitable cone 207 can be designed so that the radiative loss out the mouth of the cone can be reduced to 10% of the incoming light. In the simulation, the mouth of the cone (where the light enters) was configured to have the same area as the aperture 202 to the holraum chamber 203 employed in the previous simulation, the embodiment of FIG. 5, in which there was no concentrating cone.

In both of the above varieties of this embodiment of the invention, the efficiency is enhanced by infrared absorption of the radiation from the hot interior walls 201. A significant portion of the radiation at 2500° C. is in the infrared region of the spectrum, which is more readily absorbed by transparent gases than is visible light. The visible portion of the radiation from the walls 201 travels through the gas to other parts of the enclosed chamber 203, where it is absorbed and converted into heat energy that can be re-radiated. Each time the energy is re-radiated, the infrared portion is captured by the gas, and the visible portion continues on to repeat the process. Thus, the system is an effective mechanism for converting sunlight into absorbable energy.

As the gas of interest absorbs infrared radiation, it becomes hot and radiates energy to the surroundings. Part of this energy is returned to the walls 201, while some part is lost out the aperture 202. If cool gas is flowing into the chamber 203 through the aperture 202, this loss is reduced, since cool gas exhibits comparatively reduced energy radiation.

This alternative embodiment features exit holes 204, cooling surface 205, and exhaust tube 206 which correspond to the identically labeled elements of the embodiment of FIG. 5. Likewise, the cooling surface 205 can be cooled by water, which flows in the plenum between the cooling surface 205 and the enclosure 208. The hot gas flow out the exhaust tube 206 from the holraum chamber 203, and immediately flows through a heat exchanger (not shown) where it delivers its heat by both radiation and physical contact (forced convection). This high-grade heat can be used to produce electricity via a heat engine.

For gases that are transparent to visible light or absorb it only weakly, the inventive holraum reactor is an improvement over a funnel, especially because it affords an opportunity for molecules that absorb in the infrared region of the spectrum (including all but homonuclear diatomic molecules) to be heated through the thermalization of the light in the holraum, and it limits the amount of energy that is back-radiated to the sun.

The foregoing general reactor apparatuses are well-suited to a variety of high temperature process gases. The following are some examples of such energy-storing reactions:

$CO_2 \rightarrow CO+O$ $CH_4 \rightarrow C+2H_2$ $CO_2+CH_4 \rightarrow 2CO+2H_2$ $H_2O+CH_4 \rightarrow CO+3H_2$ In this set of processes, the most costly part of the apparatus promises to be the large focusing mirror (not shown) required. The mirror can be broken down into three major parts: 1) the pedestal, tracker and controls, 2) the large spatial mounting rack that is positioned on the pedestal and positioned by the pointer/tracker, and 3) the highly reflective mirror segments that mount to the rack. The cost of these three items (which constitute the mirror) account for between 55 and 75% of the process cost, depending on the details. Therefore, the process needs to be scaled to fit the most efficient scaling/modularization of the mirrors. If the mirror is too big, it requires a very strong pedestal and anchor to keep it from being blown over in a wind-storm. If it is too small the relative cost of the pedestal decreases, but the pointing and tracking hardware becomes large. We have determined that the optimum size is from approximately one hundred square meters to approximately a few hundred square meters of reflective surface. For most circumstances, a 100 m² size dish with a nominal solar power delivery of near 92 kilowatts is contemplated. Therefore, we scale the gas solar reactor size to accommodate 100 kW of focused solar input, but the principles and invention include reactions for trough mirrors as well.

In scaling the size of the gas reactor, two processes are sensitive to scaling. They are contact preheating and contact cooling for quenching. For both of these processes, a large cooling surface area per gas flow area (i.e. area in flow A from the fluid discharge equation where discharge Q=VA, where V is flow velocity) is needed. In all preferred embodiments, the ratio of cooling surface area to gas flow area is at least approximately 5.0. Also, for both of these processes it is preferable to constrict gas flow to small channels only 3 to 4 mm in diameter or dimension to achieve this large surface area.

The inventive apparatus is distinguishable over the large device of U.S. Pat. No. 6,066,187 in at least two respects. The '187 contemplates an "upstream" structure to do the preheating. The '187 device does not have a secondary concentrator to boost adequately the optical intensity to get high enough temperature. A secondary concentrator is required unless extremely high quality (and expensive) optics are employed. The present invention contemplates the use of a secondary concentrator (the funnel) and very high temperature ceramic components (e.g. hot rod and hot walls) to accomplish preheating. The invention also provides an improved preheating. The invention may realize some optical absorption directly into the CO2, but it is very modest. The invention provides more heating, all the way to dissociation.

INDUSTRIAL APPLICABILITY

The invention is further illustrated by the following non-limiting examples.

Figure 7:
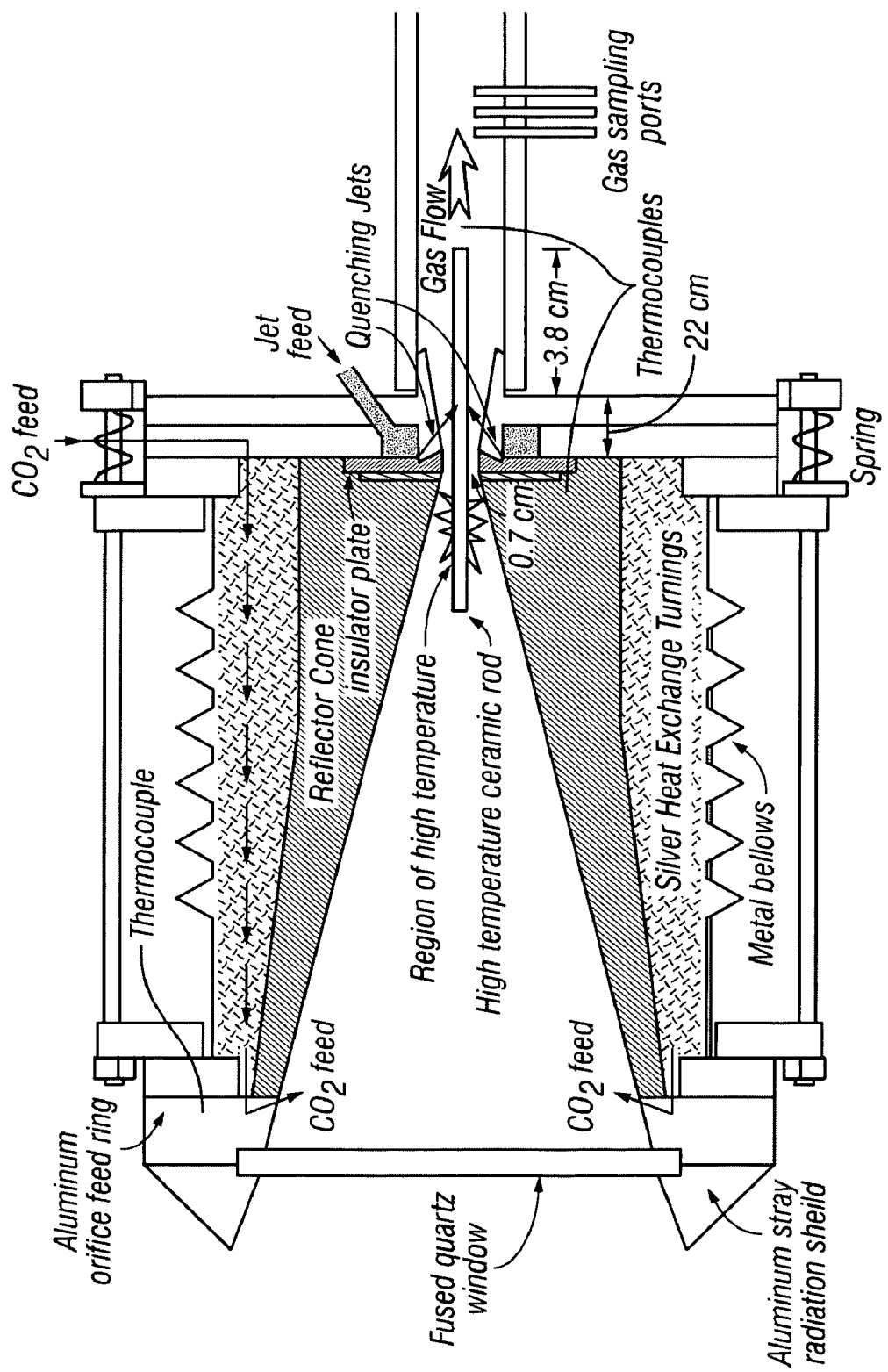
FIG. 7 is a side sectional view of a reactor apparatus system according to one embodiment of the present invention.

A prototype apparatus was built and tested, following the hot central rod funnel reactor embodiment as described above in association with FIG. 2. A detailed diagram of the apparatus is depicted in FIG. 7. A large (approximately 9 square meters) parabolic solar dish (not shown) was built. The dish consisted of many smaller spherical mirrors mounted on a superstructure that itself was approximately parabolic. The reactor was placed at the focal point of the dish. At the heart of the reactor was the metal reflector cone, which measured 15 cm along the axis. It was made of silver machined to configuration and crudely hand polished inside to a reflectivity of 75% to 85%. The $CO_2$ feedstock was introduced through the ports, and allowed to flow through silver heat exchange turnings situated between the reflector cone and an annular metal bellows. The bellows was expandably disposed between two end bodies, the end bodies in turn maintained in parallel relation by means of a set of spring-biased connecting rods. One end body was slidably movable in relation to the connecting rods, whereby the axial length of the reactor was adjustable to accommodate expansion/contraction due to temperature changes. An aluminum stray radiation shield was provided around the circumference of the mouth of the reaction chamber, the mouth itself being covered with a fused quartz window.

Continuing reference is made to FIG. 7. Feed $CO_2$ gas for the converter was preheated by routing the feed gas through an annular path (see heavy directional arrows in FIG. 7) that allowed contact with the outside of the reflector, and finally injecting the gas into the converter funnel through a set of sixteen 1.6 mm diameter holes in the hot aluminum injector or feed ring disposed around the circumference of the reaction chamber mouth. These injection holes were part of a flow path designed to equilibrate the feed gas temperature with that of the injector ring. The hot rod was a 0.63 cm diameter $ZrO_2$ rod cantilevered in the exhaust channel so that it extended into the funnel a distance of 2 to 4 cm upstream of the throat, which is the hottest part of the system. Fine jets were built into the exit channel of the converter to introduce cool $CO_2$ into the flow to quench the back reaction. They were situated just 1 cm downstream from the throat. The fine jets comprised a set of four 1 mm diameter holes at a 30° angle to the flow, placed evenly around the circumference of the channel and connected to a relatively high pressure feed plenum. They were capable of providing a gas flow of 0 to 75 l/min.

Figure 8:
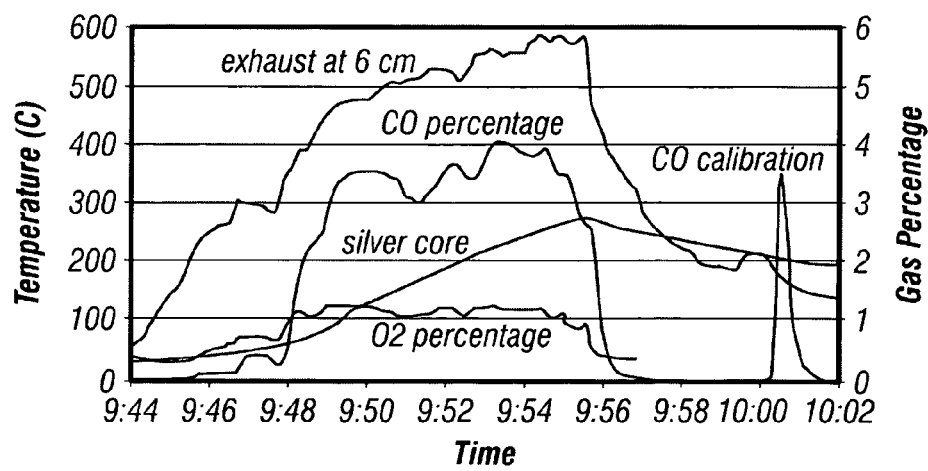
FIG. 8 is a graph of temperature versus time, correlated to gas percentage, showing temperature and gas concentration histories for a test run performed on an apparatus according to the invention, with an in-process carbon monoxide meter calibration.

Over 50 test runs were performed where appreciable CO was produced using only solar energy. Thermocouples permitted temperature readings. Temperature and product gas composition histories from one such test run are shown in FIG. 8. Mirror segments were deployed cumulatively a few at a time in this run (and most runs) to avoid thermal shock to the $ZrO_2$ rod. The CO production rises in steps in response to the increased power. For example, in the test run shown in FIG. 8, one mirror was deployed from the start. Then at time 9:47, six mirrors were deployed. Fourteen were deployed by 9:48, and finally all 22 were deployed by 9:49. Significant CO is first observed when only six segments were deployed and the temperature of the exhaust gases measured by the thermocouple 6 cm downstream of the throat read about 300 C. At this time, the temperatures in the injector ring and the body of the silver reflector had barely begun to rise above ambient. By about time 9:50, a quasi-steady radiation intensity and temperature in the hot zone were obtained. The product gas reached a CO concentration near 4%, and the $O_2$ level reading indicated near 1.5%. In other runs with tighter seals, the oxygen shows a more faithful response of one half the CO reading. As is visible in this run, the $O_2$ sampling and monitoring system has a faster response time than the CO sampling and monitoring system.

In the test run shown in the FIG. 8, the $CO_2$ feed rate was 10 liters per min (l/min) and the jet flow rate was zero. Immediately after the run, at time 9:55:30, the reactor was taken off the sunlight focus and a commercial sample of CO was injected through the jet gas line into the system to provide a calibration of the system. The point at which the converter was taken off-sun is obvious from the temperature slope reversal seen in the figure.

Test runs were completed to establish the consistency of the prototype operation and to characterize its behavior. Most of the runs were performed with a $CO_2$ feed flow rate of 10 liters/min STP, all at ambient pressure. In the many test runs performed without jet flow, a range of relatively high CO percentages were recorded, with the highest being 6.0% and with many over 4%.

In some test runs, jets were turned on at various flowrates, as shown in Table 1. The immediate effect was a drop in the product gas temperature and the CO and $O_2$ concentrations. These decreases were primarily the result of dilution. It will be noted, however, that the CO concentration was generally a little higher than would be expected by simple dilution. This is probably because the cool gas injection by the jets quenches the back reaction more rapidly than when no jet gas is flowing, thus leaving a larger net production of CO. Higher conversion of solar to chemical energy was observed for these runs than those without jet flow. The best run in this regard was run 30, which yielded 5% solar to chemical energy conversion in spite of many compromises in optics and flow in this first set of experiments.

TABLE 1

Test Runs with Jet flow

| Run | Feed Flow (L/min) | Jet Flow (L/min) | Peak Exhaust Temperature (C.) | Highest CO percentage | Conversion of solar into chemical energy |
|---|---|---|---|---|---|
| 30 | 12 | 76 | 220 | 1.2% | 5.14% |
| 32 | 10 | 63 | 183 | 1.0% | 3.78% |
| 58 | 10 | 60 | 332 | 0.9% | 3.12% |
| 62 | 10 | 18 | 433 | 2.1% | 2.97% |

Table 2 shows the measured and estimated temperatures for test runs without jet flow at various points in the process gas channel, and the temperatures of the reflector cone and the feed ring. These latter two structures, which typically stay within a few degrees of each other, are referred to as the metal core. All of the temperatures below 1400 C were measured directly in multiple runs. They represent an estimate of the weighted average (over several runs) early in the period of high CO production.

TABLE 2

Converter and Exhaust Channel Operating Temperatures without Jet flow

| | Reaction Zone | Throat | Jet Position | Exhaust Funnel | Tail Pipe | Metal Core |
|---|---|---|---|---|---|---|
| Position downstream from the throat (cm) | −4 to 0 | 0 | 1.0 | 2.2 | 6 | N/A |
| Temperature (C.) | 2350 | 2300 | 1350 | 850 | 550 | 250 |

The temperature values differ a little from run to run and vary within a run, but by not more than approximately 100 C. The reaction zone temperature is estimated by the behavior of the $ZrO_2$ rods, which were advertised as operable up to 2400 C. After many of the runs the rod was found to be partially melted or largely glazed. The observation of a partial rod melt was used as an indicator of 2400 C. We know that the $CO_2$ gas becomes absorbing at these temperatures, and tends to aid in the heating of the bulk gas as it moves along in this nominally laminar flow. The back reactions, as discussed below, contributed several hundred watts of heat load to the exhaust channel. This heat source is indicated by the fact that melting of the $ZrO_2$ rod occurred several millimeters downstream from the throat of the reflector cone, and at least a centimeter downstream from the zone of highest irradiation. The rapid cooling of the exhaust channel indicates a strong participation of radiant heat transfer in this system, which is also consistent with the optical participation of $CO_2$ in the heat balance of the system. Some cooling also is derived from a very slight leakage of air between the flanges at the rear of the apparatus. This is supported by the observation that the oxygen monitor never indicated zero. Its base reading in the experiments seems to be more like 0.5 to 1%, which when added to the 0.8% noise, explains the observed oxygen monitor base-line traces.

The best net conversion of $CO_2$ to CO yet measured by the apparatus has been near 6%, which is compared to a plant design of 12%. The peak observed conversion of solar energy to chemical energy was 5%. It is believed that the dissociation that occurred in our prototype was due to contact heating, and there was very little if any direct photolysis.

Figure 9:
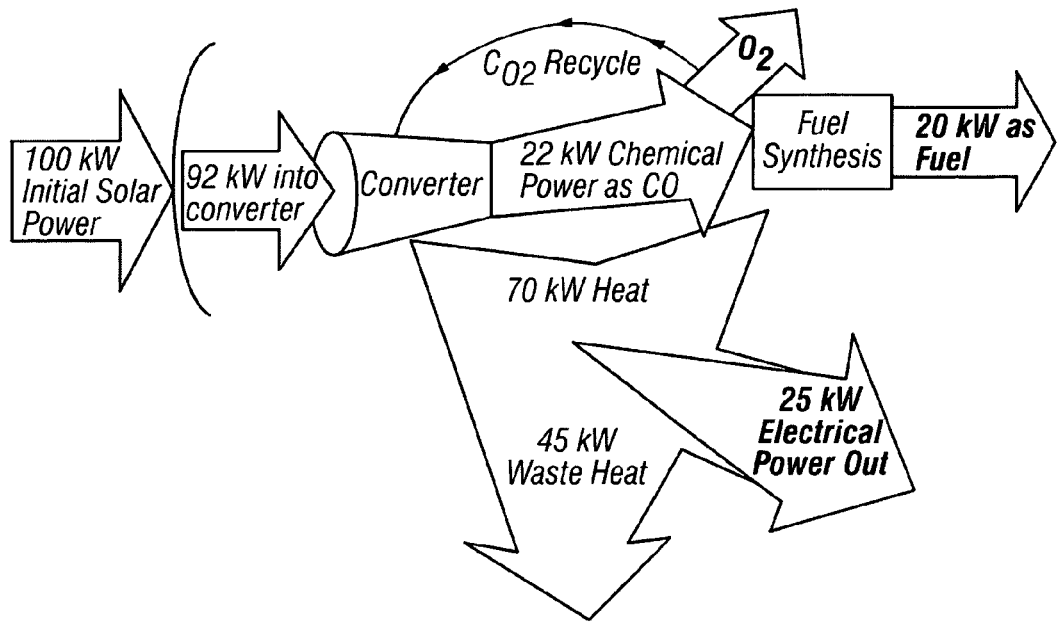
FIG. 9 is a chart illustrating energy conversion paths and goals with a 100 kW solar power dish in association with and according to the present invention.

Using the results found with the prototype apparatus and modest performance projections, it is seen that a viable renewable energy system based on solar dissociation of $CO_2$ can be developed. In FIG. 9, energy conversion and transfer goals are shown that would result in a desirable overall system.

Modeling Results

Hot Central Rod Funnel Reactor Prototype: The efficacy of the process has been shown both by experimental demonstration and computer simulation through known laws of physics. The foregoing example provided an experimental verification of the apparatus of FIG. 2; now, a modeling of that apparatus is provided. The simplest model is performed by using measured flow rates and temperatures in the flow channel to set the conditions for the following equations, Equations 2–5 below. The rate constants for the equations are given in by Tsang, W., et al., "*Chemical Kinetic Data Base for Combustion Chemistry, Part* 1, *Methane and Related Compounds,*" J. Phys. Chem. Ref. Data. 1986, 15, 1087.

$$CO+O+M=CO_2+M \quad \text{(Equation 2)}$$

$$CO_2+O=CO+O_2 \quad \text{(Equation 3)}$$

$$CO+O_2=CO_2+O \quad \text{(Equation 4)}$$

$$O+O+M=O_2+M \quad \text{(Equation 5)}$$

Figure 10:
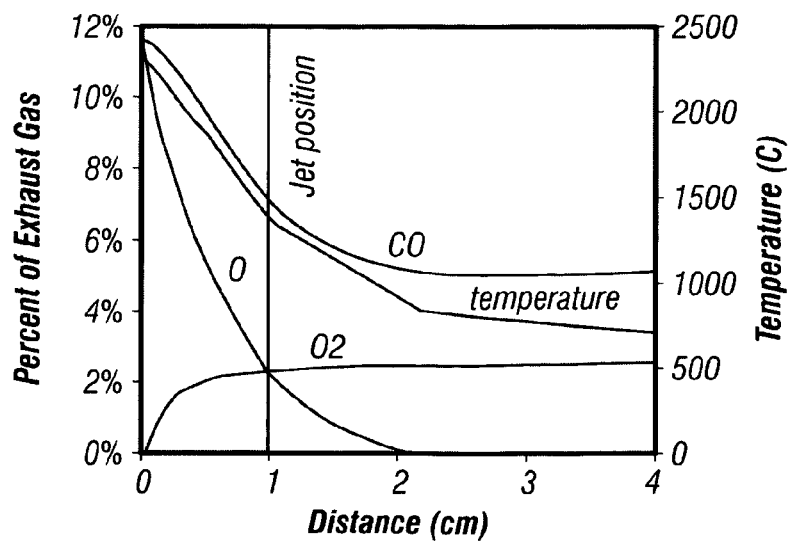
FIG. 10 is a graph of percent of exhaust gas versus distance, correlated with time, showing calculated concentrations of carbon monoxide, atomic oxygen, and molecular oxygen in the carbon dioxide process gas, initialized at the throat of the reflector cone and flowing down the exit channel of an embodiment of the apparatus of the invention (at typical flowrate of actual tests)

The measured flow rates and temperatures (linearly interpolated between the four measured or estimated points in Table 2) along the converter exit channel were used as model inputs. The calculation was based on the simple assumption that all of the CO and O were instantly formed in a single step at the throat of the exit channel. The results of the calculation are shown in FIG. 10. The model shows a significant amount of back reaction, to the extent of approximately 50 to 70% of the initially formed CO. The model also provides a basis for understanding the observed CO percentage as it relates to temperatures in the reaction zone and along the exit channel. Observing about 5% CO in the final exhaust gas implies an initial concentration of about 12% CO at the throat. The model shows that by the position of the jets (1 cm down the channel), only 20% of the original O atom concentration remains. This is consistent with the observation that operation of the jets in their current position increases the net CO product by only about 20 to 25%. This simplified model assumed that the temperature in the flow channel depended only on the distance from the throat and that it was the same at all radial positions.

Figure 12:
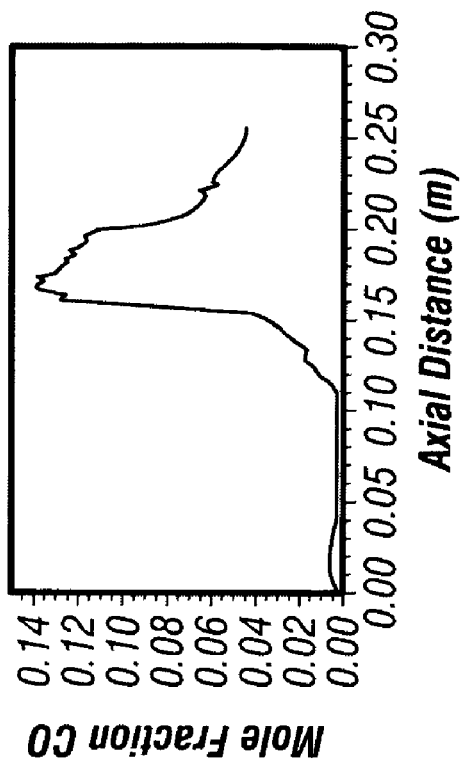
FIG. 12 is a graph depicting mole fraction of carbon monoxide versus distance, radially averaged, as measured in test runs performed using the apparatus of the invention shown in FIG. 7.
Figure 11:
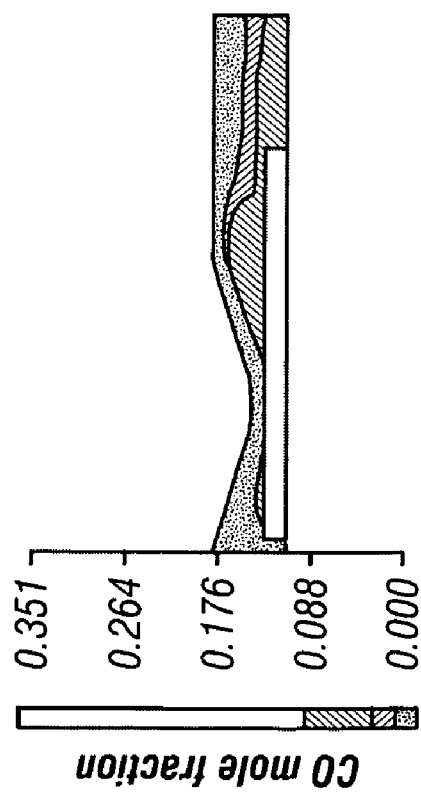
FIG. 11 is a graphical greyscale representation of the results of a 3-D model of the central hot rod reactor showing the mole fraction of carbon monoxide at various regions in the process gas.

To show more detail about the functioning of the reactor embodiment of FIG. 2, a three dimensional model was performed using the same input data as above, plus the condition that the central hot rod was always as 2400 C. FIG. 11 shows spatially where and how the carbon monoxide was formed. The geometry represented is the top part of a longitudinal cross section, and the white bar is the hot central rod. FIG. 12 shows the radially-averaged CO mole fraction versus the distance down the throat of the flow channel. The conditions of the model are typical of prototype operating conditions, and the agreement with observation builds confidence in the model.

Figure 14:
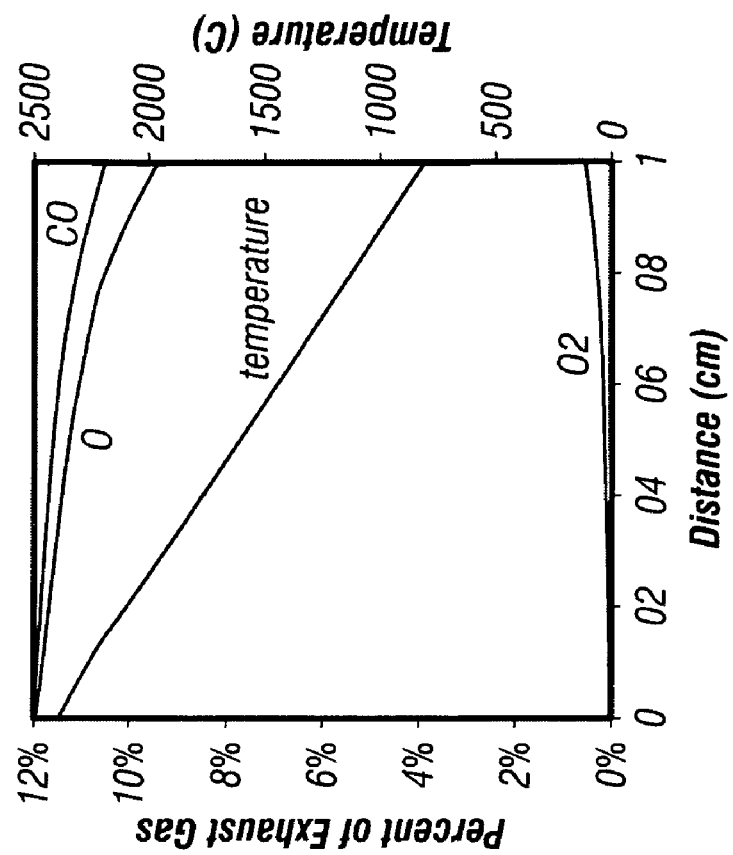
FIG. 14 is a graph of percent of exhaust gas versus distance in centimeters, correlated to temperature, showing the results of simple kinetic modeling for a cooling channel in an embodiment of the apparatus of the present invention.
Figure 13:
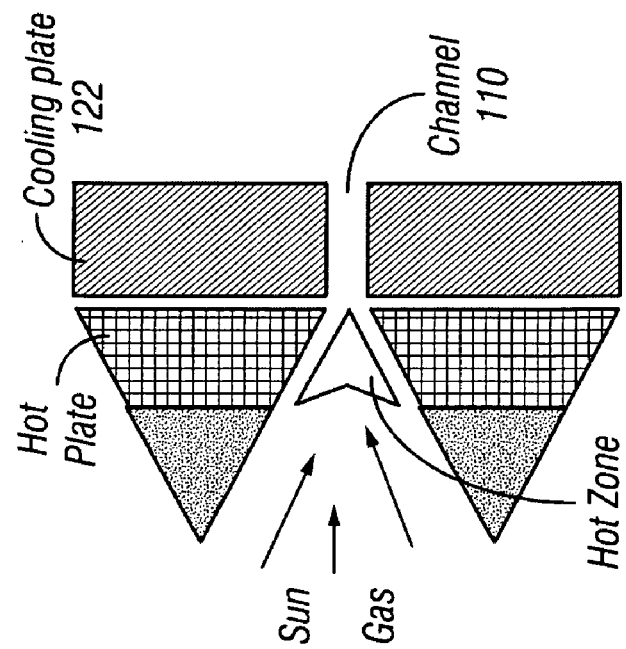
FIG. 13 is a schematic side (longitudinal) sectional view, enlarged, of a small funnel design for use in a multi-nozzle embodiment of the apparatus with cooling channel.

Modeling of Multinozzle Design: A simple chemical kinetics model such as was first described for the FIG. 2 hot central rod case was also built for a small nozzle design without a hot central rod. This model is applicable for the designs shown in FIGS. 1 and 3. It shows the reactions that will occur in the channel 110 in the cooling plate 122, as shown in FIG. 13. It assumes that the channel diameter is 4 mm and length is 1 cm, the entering gas temperature is 2400 K and exiting gas temperature is 800 K, and the gas flow rate is 0.00044 kg/s. An initial concentration of $CO_2$, CO, and O is also given in the model. The resulting graph is shown in FIG. 14. The ending CO concentration is still over 10%. Thus, only 15% of the initial CO was lost to back reaction in this design, showing that rapid cooling really does effectively quench the back reaction of CO.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for solar powered processing of a slightly-absorbing or transparent gas, comprising the steps of:
    passing the process gas through a reaction zone;
    concentrating incoming solar radiation in the reaction zone to drive an endothermic dissociation reaction in the process gas; and
    quenching undesirable back reactions by rapidly cooling the process gas immediately downstream from the reaction zone, the quenching step further comprising contacting the process gas with a cooling surface.

2. The method of claim 1 wherein the step of quenching undesirable back reactions comprises quenching the reactions: $CO+O+M \rightarrow CO_2+M$ and $CO+O_2 \rightarrow CO_2+O$.

3. The method of claim 1 comprising the additional step of gathering heat from a reactor structure to suppress re-radiation and to drive a heat engine.

4. The method of claim 3 wherein the step of gathering comprises gathering heat from the cooling surface.

5. The method of claim 1 wherein the process gas is $CO_2$ and the step of rapidly cooling comprises dropping the process gas temperature to a quench temperature of less than approximately 800 C.

6. A method for solar powered processing of a gas that absorbs only infrared light, the method comprising:
    directing solar energy, in the form of light rays, through an intake aperture into a holraum reactor chamber;
    pumping the gas into the holraum reactor chamber;
    allowing the light rays to repeatedly strike interior walls of the holraum reactor chamber;
    heating the process gas by infrared radiation from the interior walls to drive an endothermic dissociation reaction in the gas; and
    quenching undesirable back reactions by rapidly cooling the gas immediately downstream from the chamber, the quenching step further comprising contacting the gas with a cooling surface.

7. The method of claim 1 wherein the step of concentrating incoming solar radiation in the reaction zone comprises:

admitting solar energy into the mouth of a highly reflective funnel while providing the funnel with a longitudinal centerline axis and a wall having an optically smooth inner surface; and defining with the funnel a radial cross-sectional area, wherein the cross-sectional area monotonically decreases along the axis from the mouth toward said reaction zone.

8. The method of claim 7 wherein the step of providing the funnel with a wall comprises defining with the wall a cone of revolution around the axis.

9. The method of claim 7 wherein the step of providing the funnel with a wall comprises defining with the wall a paraboloid of revolution around the axis.

10. The method of claim 7 further comprising preheating the process gas, the preheating step comprising the steps of:
  directing sunlight energy to the centerline axis;
  disposing a ceramic rod on the axis and extending at least partially into the reaction zone; and
  heating the ceramic rod with sunlight energy.

11. The method of claim 10 further comprising contact heating the process gas with the ceramic rod to induce molecular dissociation of the gas along and in the immediate vicinity of the rod.

12. The method of claim 1 wherein the step of passing the process gas through a reaction zone comprises:
  providing a holraum reactor chamber with black interior walls and an intake aperture; and
  pumping the process gas into the reactor chamber through the intake aperture in the chamber.

13. The method of claim 12 wherein the step of concentrating incoming solar radiation in the reaction zone comprises the step of focusing a beam of sunlight into the intake aperture.

14. The method of claim 12 wherein the step of providing a holraum reactor comprises providing a ratio of the area of the intake aperture to the area of the interior walls of less than approximately 0.5.

15. The method of claim 14 wherein the step of concentrating incoming solar radiation further comprises the steps of:
  attaching a reflective cone to a front of the aperture to reduce the cross sectional area of the beam of sunlight; and
  generally corresponding the cross sectional area of the beam to the area of the intake aperture.

16. The method of claim 13 further comprising the step of heating the process gas by infrared radiation from the interior walls.

17. The method of claim 1 wherein contacting the process gas with a cooling surface comprises the steps of defining a process gas flow area and defining a cooling surface area, wherein the ratio of the cooling surface area to the gas flow area is at least 5.0.

18. The method of claim 1 wherein the step of passing the process gas through a reaction zone comprises the steps of:
  passing the process gas through an array of a plurality of small fore-funnels to supply increased contact area for heating the gas; and
  fashioning from high-temperature ceramic a throat end portion of each of the fore-funnels.

19. The method of claim 18 wherein the step of concentrating incoming solar radiation in the reaction zone comprises intensifying solar energy near the throat end portion of each fore-funnel to create hot walls in each fore-funnel for heating and dissociating the passing gas.

20. The method of claim 19 wherein contacting the process gas with a cooling surface comprises flowing the gas through a cooling channel corresponding to and leading from each fore-funnel.

21. The method of claim 6 further comprising the step of providing a ratio of the area of the intake aperture to the area of the interior walls of less than approximately 0.5.

* * * * *